United States Patent [19]

Francis et al.

[11] Patent Number: 4,996,092
[45] Date of Patent: Feb. 26, 1991

[54] SHAPED FOAM

[75] Inventors: David J. Francis; David R. Bastow, both of Atherstone, England

[73] Assignee: Minnesota Mining and Manufacturing Company, St. Paul, Minn.

[21] Appl. No.: 475,116

[22] Filed: Feb. 5, 1990

[30] Foreign Application Priority Data

Feb. 20, 1989 [GB] United Kingdom ............... 8903779
Oct. 20, 1989 [GB] United Kingdom ............... 8924121

[51] Int. Cl.⁵ .............................................. B32B 3/26
[52] U.S. Cl. ................................. 428/157; 264/321; 428/159; 428/160; 428/317.1; 428/317.3; 428/319.3; 428/906
[58] Field of Search ............... 264/321; 428/157, 159, 428/160, 317.1, 317.3, 319.3, 906

[56] References Cited

U.S. PATENT DOCUMENTS

| | | | |
|---|---|---|---|
| 2,793,676 | 5/1957 | Hubmeier | 156/462 |
| 2,874,084 | 2/1959 | Paulsen | 428/397 |
| 3,320,108 | 5/1990 | Lande | 156/219 |
| 3,519,708 | 7/1970 | McMichael | 428/319.3 |
| 3,634,565 | 1/1972 | Schaerer | 264/54 |
| 4,393,116 | 7/1983 | Taylor | 428/343 |
| 4,410,383 | 10/1983 | Lipari | 156/73.1 |
| 4,740,256 | 4/1988 | Vosberg | 156/73.1 |
| 4,755,408 | 7/1988 | Noël | 428/159 |
| 4,833,016 | 5/1989 | Segawa et al. | 428/317.1 |

FOREIGN PATENT DOCUMENTS 207720 1/1987 European Pat. Off. .

OTHER PUBLICATIONS

"Foamed Plastics", Kirk-Othmer Enc. of Chem. Tech., 3rd Ed., vol. 11, pp. 82–126 (1980).
Caligen, Creative Foam Technology, 6 pages, no date.

Primary Examiner—William J. Van Balen
Attorney, Agent, or Firm—Donald M. Sell; Walter N. Kirn; David R. Cleveland

[57] ABSTRACT

Elongate foam strips are formed by cold welding a flat foam web using blunt rotary cutters. A manually separable array of foam strips is formed by welding a flat foam web along a series of parallel lines, using cold welding or other joining methods, and packaging the array without separating the individual strips from one another.

24 Claims, 3 Drawing Sheets 4,996,092

SHAPED FOAM

BACKGROUND OF THE INVENTION

This invention relates to the production of articles from plastic foam and in particular to the production of foam articles having curved surfaces which may bear a coating of functional or decorative utility.

The most common form of foam production is to form webs or blocks of foam which may have a wide range of widths and thicknesses. Shaped foam articles may be fabricated from the foam webs by cutting, folding, compressing or adhering one or more sections of foam web. Shaped foam articles may also be produced by forming the foam in situ in a mold. However, these techniques are not practical for the commercial production of elongate strips, particularly those having a length of several meters or more.

Foam articles having curved surfaces have been produced by cutting or sculpturing a foam web or block. They have also been produced by shaping a first foam web by folding or compression (e.g., in a mold) and adhering a second foam web or other substrate to the shaped foam, thereby preventing the shaped foam from returning to its original form. The adhering step can be carried out using an adhesive or welding, e.g., by application of heat or ultrasonics. An example of such a shaping technique is disclosed in U.S. Pat. No. 4,740,256 which discloses a process for making elongate weather strips.

SUMMARY OF THE INVENTION

Some foams may be "cold welded". Cold welding occurs when a foam fuses if cut or sheared under pressure. For example, cosmetic pads have been stamped from a thin foam web using a cutter having a blunt edge. During the stamping operation a weld is formed where the foam is compressed, resulting in a welded seam.

It has been found that cold welding using blunt rotary cutters may be utilized to fabricate from foam webs and blocks a wide range of elongate shaped articles of any desired length.

According to one aspect of the invention there is provided a foam article formed of a cold-weldable form, the article being in the form of an elongate strip comprising a curved surface, the article having at least one welded seam along its longitudinal length which maintains the configuration of the curved surface. In this fashion, elongate circular cords of remarkable circular symmetry- can be formed from flat foam web.

According to another aspect of the invention there is provided an array formed from a plurality of adjacent, parallel foam strips, each strip comprising a curved surface between two longitudinal weld seams which maintain the curvature of the surface, adjacent strips being joined to each other by a longitudinal weld seam, and the individual strips being manually separable from the array. In this latter embodiment of the invention, cold welding is a preferred technique for forming the weld seams, but is not required.

The invention also provides methods for producing the above mentioned foam article and array.

DETAILED DESCRIPTION

The invention will now be described by way of example with reference to the accompanying drawing.

Figure 1A:
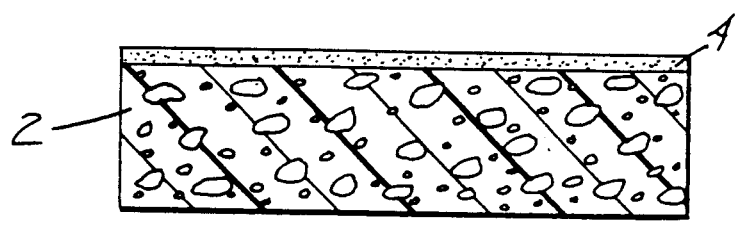
FIGS. 1A to 1C illustrate cross-sectional views of the production of separated cylindrical foam cords in accordance with a first embodiment of the invention.
Figure 1B:
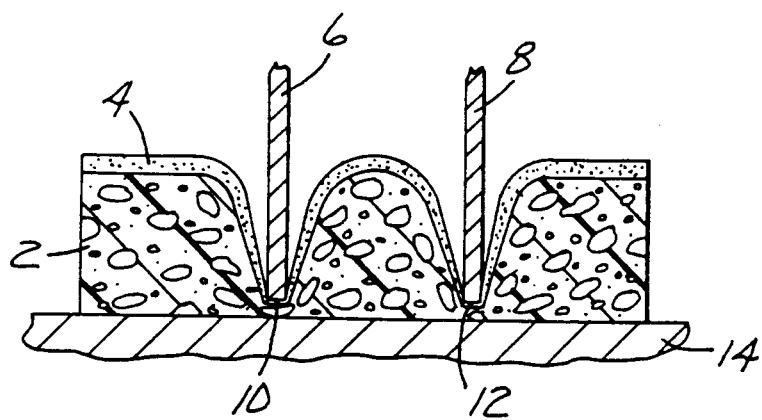
Figure 1C:
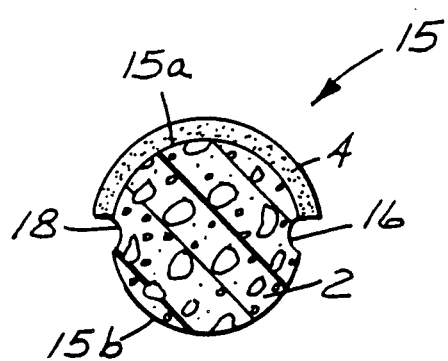

Referring to FIGS. 1A to 1C, foam web 2 bearing a pressure sensitive adhesive coating 4 is shown in FIG. 1A in an uncompressed state, in FIG. 1B in a compressed state during welding, and in FIG. 1C in the welded state. FIGS. 1A to 1C are all crossweb sectional views. In other words, each view is taken across the longitudinal or elongate direction in which the foam web would conveniently be handled in roll form using conventional winding and unwinding equipment. Referring to FIG. 1B, web 2 is passed through a pair of rotary cutters 6, 8 (shown diagramatically) which have blunt cutting edges 10, 12. Because the rotary cutters need not actually cut the foam web, they could be called "rollers" rather than "cutters". However, because they are conveniently fabricated from rotary cutting blades that have lost their cutting edge (or deliberately had the edge dulled), the term "cutters" will be used for purposes of explaining the invention. Rotary cutters 6, 8 are urged towards a hard surface 14, conveniently in the form of a metal roller. The metal roller may be driven and the rotary cutters free to rotate thereby allowing long continuous webs to be processed. The cutters 6, 8 bear against hard surface 14 with a force sufficient to achieve cold welding of the web 2. The foam web may be compressed on either side of the cutters with a spacer (not shown) to reduce friction between the sides of the cutter and the foam.

Referring to FIG. 1C, after separation and elastic relaxation the individual strips are in the form of a foam cord 15 having a circular cross-section. Semi-circular surfaces 15a and 15b are flanked by longitudinal welded seams 16 and 18. The density of the foam is low (approximately that of the uncompressed web 2) near the center of cord 15, and increases in the region of welded seams 16 and 18. The cord may conveniently be wound on itself or on a core (not shown). The cord optionally bears a release coating (not shown), e.g., a silicone or fluorocarbon coating on its underside to facilitate unwinding. Foam cord 15 is useful as a sealing strip, packaging material or masking material, e.g., to fill gaps between a car door and car body prior to paint refinishing.

Figure 2:
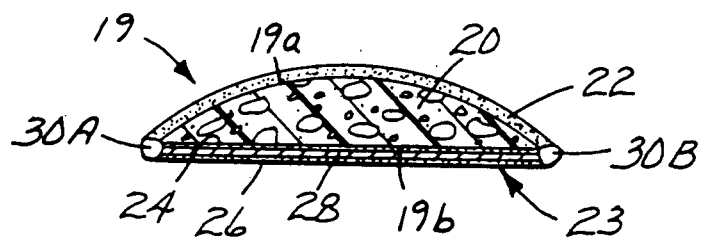
FIG. 2 represents a cross-section through an elongate foam abrasive strip in accordance with a second embodiment of the invention.

FIG. 2 illustrates a cross-section through an elongate foam abrasive strip 19 formed from a foam web 20 bearing an abrasive coating 22 on curved surface 19a and a double-sided adhesive tape 23 (having adhesive layers 24 and 26, and substrate 28) on flat surface 19b. Welded seams 30a and 30b were formed using a blunt rotary cutter. Because the substrate 28 is stiffer (less flexible) than foam web 20, surface 19b is substantially flat or planar after welding. Abrasive coating 22 is flexible and permits upper surface 19b to adopt a curved configuration after welding. The foam is compressed in the region of longitudinal welded seams 30a and 30b. Adhesive layer 26 can be covered with a release liner (not shown) to facilitate storage of strip 19 before use. Strip 19 may readily be attached via adhesive layer 26 to a power tool (for example, an air file, not shown) for sanding, grinding, etc.

Figure 3:
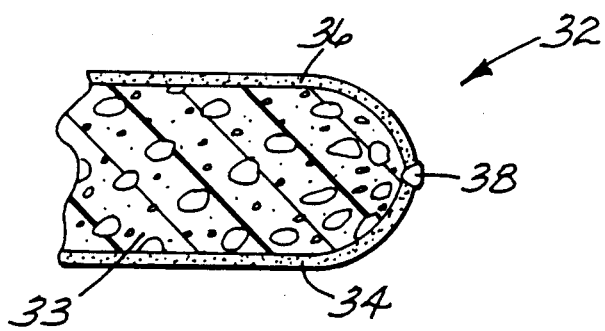
FIG. 3 represents a cross-section through an elongate abrasive block having a tapered edge in accordance with a third embodiment of the invention.

FIG. 3 illustrates in cross-section a portion of an elongate abrasive block 32 prepared in accordance with the invention. Block 32 is formed from foam web 33 having abrasive coatings 34, 36 on its major surfaces. One or more edges of the block are be formed by cold welding web 33 to form a cold weld seam 38 providing a curved abrasive surface near the edge of the block.

Figure 4:
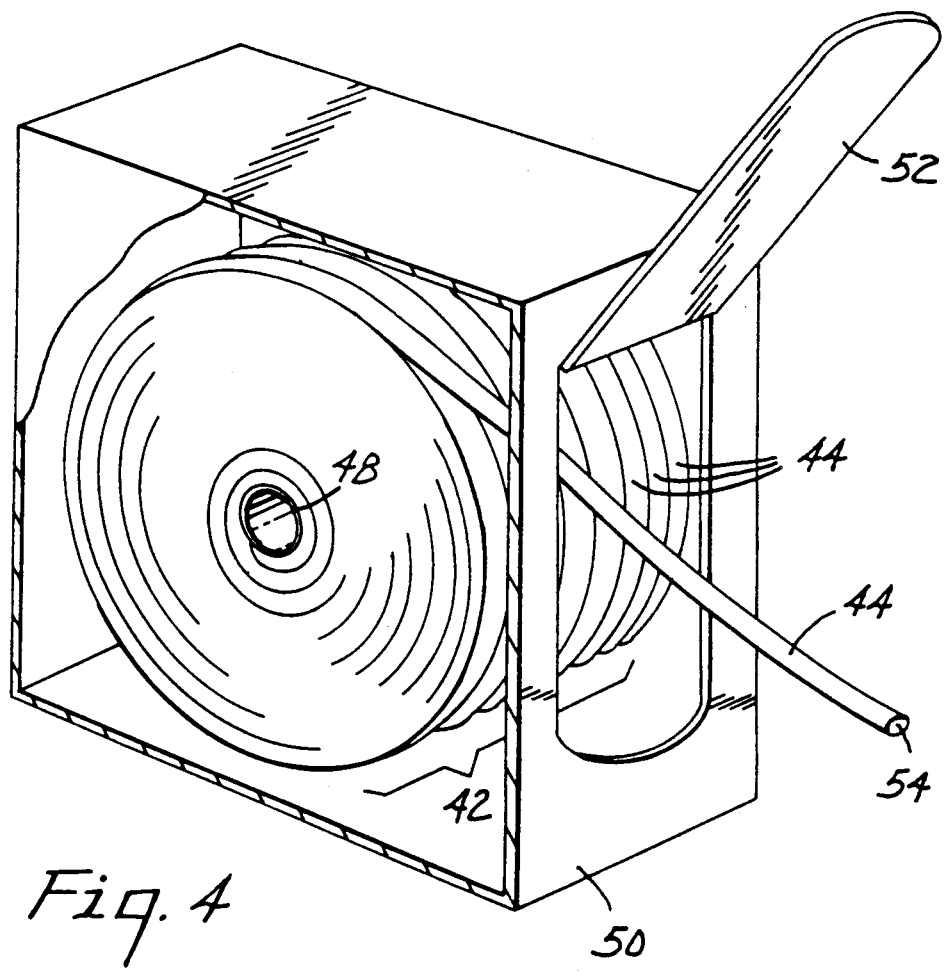
FIG. 4 represents a perspective view of a packaging system (with the package sidewall partially broken away) for an array of parallel, joined foam cords in accordance with a fourth embodiment of the invention.
Figure 5:
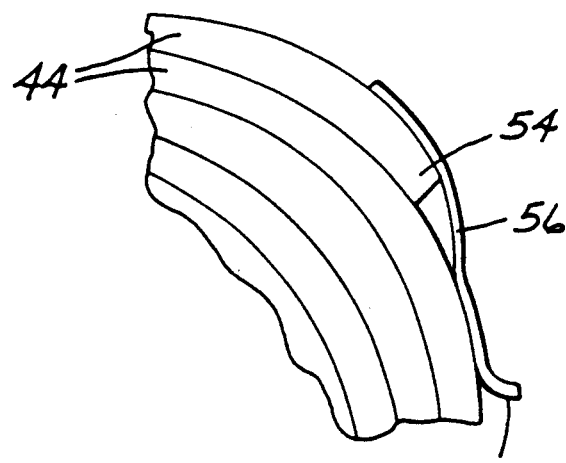
FIG. 5 represents a fragmentary side view of the packaging system of FIG. 4.
Figure 6:
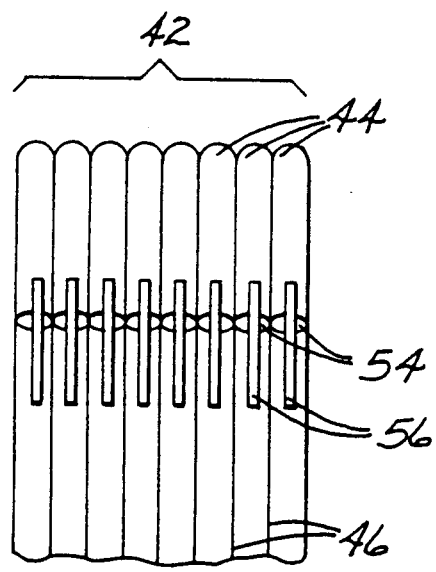
FIG. 6 represents a fragmentary end view of the packaging system of FIG. 4.

Referring to FIGS. 4 to 6, an array 42 of parallel foam strips 44 joined via the welded seams 46 is wound on a core 48 which is supported for rotation within a carton 50. The carton is conveniently made of corrugated cardboard. The carton has a flap 52 to provide ready access to the contents. The exposed end 54 of each foam cord is temporarily secured to the array by an adhesive tape 56 which may conveniently be provided with a tab 58 to facilitate removal. When it is desired to dispense a foam strip, the adhesive tape is removed and the exposed end of the strip pulled, which causes shearing of the seam separating the strip from the remainder of the array and rotation of the wound array. The remainder of the array remains neatly stored on the roll. If desired it is possible to dispense a composite of two or more strips joined to each other by pulling the ends of those strips simultaneously.

The invention can be further understood from the following detailed discussion. For example, when making the cold-welded elongate foam strips of the invention, a predetermined area of an elongate foam web is longitudinally compressed using a blunt rotary cutter. This is conveniently carried out by moving the web between the cutter and a roller. In order to carry out cold welding, the web should be compressed under sufficient pressure so that an elongate welded seam fuses opposing surfaces of the web to each other, thereby permanently deforming the web and providing a curved surface adjacent the weld. If it is desired to produce individual, separated foam strips, then the cutter force can be kept sufficiently high to shear the strips apart at the weld lines during the cold-welding step. The strips can also be pulled apart laterally (i.e., automatically) downweb from the cold welding step, or a separate slitting blade can be employed to separate the strips. When it is desired to produce an array of separable foam strips, then the cutter force should be kept sufficiently low to prevent undesired separation of the strips at the weld lines, but sufficiently high to achieve thorough cold welding and permit easy manual separation of the strips. As a general guide, webs having a thickness of about 14 to 25 mm may be processed into an array of manually separable foam strips by using cutters having a blunt edge that is about 0.5 to 1.5 mm thick, and applying a cutter downforce of about 136 to 159 kg per pair of cutters.

In this fashion, one can fabricate foam cords having a variety of curved surfaces and any desired length from cold-weldable foam web. A single cold welding operation will result in a web having a curved surface near the weld and opposing flat surfaces remote from the weld. The use of two parallel cold welding operations will result in a strip having curved surfaces near each weld, and a strip having an oval or circular cross-section depending upon the spacing between the welds. The method of the invention is simple and efficient, and permits forming and slitting the shapes simultaneously without requiring the use of molds.

Polyester foam is preferred for use in the cold welded embodiments of the invention. The foam preferably has a density of about 26 kg/m$^3$. A preferred cold-weldable foam is commercially available from Caligen Foam Limited under the trade designation "grade 4273A".

It has also been found that the rotary cold welding technique will work effectively with coated foam webs. Treating flat webs of material to provide a uniform coating is a straightforward operation that can be carried out with many types of suitable apparatus, e.g., by spraying, brushing, rolling, knife coating, etc. Coating, particularly partial coating, of articles already having a curved surface requires more sophisticated techniques. The invention permits simple manufacture of shaped foam articles that are partially or fully coated on their curved surfaces by coating the desired area of a flat foam web and then cold welding the web to form the shaped article.

Suitable coating materials should be capable of adhering to the foam and include adhesives, e.g., pressure sensitive adhesives, and binders, e.g., cross-linking polymers, optionally incorporating pigments or abrasives, e.g., silicon carbide and aluminum oxide. As noted above, the coating may also be in the form of a substrate bonded to the foam web, the substrate having a lower degree of flexibility or elasticity than the foam. Such a substrate produces a flatter surface after cold welding than would be formed by the foam in the absence of the substrate.

Foam strips or cords of the invention having a circular or elliptical cross-section will find particular utility as a masking material in vehicle body workshops. The strip is used to fill gaps between a door and frame, bonnet and frame, boot lid and frame, etc., prior to paint spraying. The strip is preferably partially coated with a pressure-sensitive adhesive to hold it in the desired position and allow ready removal after use. The foam is preferably an open cell foam since this allows efficient absorption of paint and enables a feather edge to be attained.

It will readily be appreciated that a wide variety of elongate shapes may be produced by the method described above. For example, conical surfaces may be obtained by cold welding the web along two convergent lines, using rotating blunt cutting wheels arranged in a v-shaped configuration. For purposes of explanation, these convergent weld lines will be regarded as "longitudinal", since they lie substantially in the web processing direction and can be formed using rotary cutters. Such conical shapes may have abrasive surfaces for grinding and cleaning purposes or be dimensioned for uses as ear plugs and the like.

As noted above, the invention also includes an array of foam strips joined to each other by longitudinal welds, the strips being manually separable from one another. Such an array can readily be formed into a roll, e.g., by winding on a core, and individual strips may readily be separated since the compressed weld foam material shears easily between the adjacent strips. Thus, packaging the foam strip in the form of an array is simplified compared to winding and packaging individual strips. Also, large amounts of foam strips are often required for masking purposes in a vehicle body shop, and it is convenient to supply the strips in robust, stable boxes containing the desired length of strips in readily dispensable form. It has been found that an array of at least 4 joined strips, e.g., 4 to 10 joined strips, wound on a spindle or core and supported within a carton is particularly suitable. The exposed ends of one or more of the strips are preferably secured to the underlying layer, e.g., with adhesive tape. By pulling the strip (or strips) to be dispensed, the strip will unwind and simultaneously shear from the array.

As noted above, the array of foam strips or cords may be prepared from a flat foam web by compressing the web along a series of parallel lines and welding the compressed foam. The compressed foam may be welded ultrasonically, by heating or by cold welding. The compression and welding steps form a longitudinal weld of two or more adjacent foam strips and the strips are joined together by material forming the weld.

Arrays of the invention are most conveniently formed by cold welding, e.g., by passing a foam web through three or more parallel rotary cutters which may be mounted on a common axis and acting on a hard surface, the cutters being arranged to compress and cold weld the foam without completely shearing the web. The strips in the resulting array are joined by a thin section of compressed welded foam. These sections will readily shear if lateral force is applied and care must be taken to avoid such lateral forces when winding and packaging the array.

Any suitable compressible foam which may be welded may be employed to form the arrays of the invention. The foams may be open or closed cell foams and may have a wide range of lengths, thicknesses and widths. Suitable types of foam are disclosed in "Foamed Plastics", *Kirk-Othmer Enc. of Chem. Tech.*, 3rd Ed. Vol. 11, pp. 82–126 (1980) and include polystyrene, polyvinylchloride, polyethylene, polyurethane, polyisocyanate, polyphenol, polyester and silicone foams. Foams having a density of about 20 to 30 kg/m$^3$ are generally useful. The selection of foam material depends upon the fabrication method for forming the array and the intended use of the articles or strips.

As with the individual foam cords of the invention, an array of parallel, joined cords or strips may be formed from a coated or uncoated foam web. If the cord is required to have an adhesive over part of its surface the adhesive may be applied over an entire surface of the foam web prior to welding, or in bands between the areas which are to be welded. The web area that is coated prior to welding may affect the profile of the curved surface produced after welding and the thickness of the adhesive bands may be varied to achieve the desired profile. Alternatively, the adhesive may be applied to a surface of the array of parallel, joined cords after the longitudinal welds have been formed, but this is typically less convenient than adhesive application prior to welding.

The foam strips forming the array do not require the presence of a polymeric film extending between the longitudinal welds to maintain the curved profile of each strip. The presence of such a polymeric film may prevent manual separation of the strips of the array unless the polymeric film is treated to provide lines of weakness, e.g., scoring, partial slitting, perforating, etc., to facilitate tearing of the polymeric film between the strips. Moreover, the presence of such a polymeric film is undesirable for masking purposes since it can inhibit capture and absorbance of paint droplets by the foam.

It will be appreciated the individual foam cords of the array need not have a circular cross-section, depending upon the spacing of the welds. Also, it is readily possible to form cord arrays of different dimensions by variation of the thickness of the web and the distance between adjacent welds in the web.

Although the invention has been described by reference to several preferred embodiments, other variations within the scope and spirit of the invention will be apparent to those skilled in the art. Accordingly, the invention should not be limited to the preferred embodiments described in this specification.

We claim:

1. A foam article formed of a cold-weldable foam, the article being in the form of an elongate strip comprising a curved surface, the strip having at least one welded seam along its longitudinal length which maintains the configuration of the curved surface.

2. An article as claimed in claim 1, the article comprising a pair of welded seams, and the article having an oval or circular cross-section, a density that increases near the weld seams, and a length of more than one meter.

3. An article as claimed in claim 1, wherein the strip is at least partially coated with a layer of adhesive.

4. An article as claimed in claim 3, wherein the strip is in the form of a paint masking gasket whose length and diameter are suitable for disposition of the strip between a vehicle door and a vehicle body.

5. An article as claimed in claim 1, comprising a pair of welded seams inclined towards each other, the strip having a generally conical surface.

6. An article as claimed in claim 5, wherein the strip is in the form of an ear plug.

7. An array of adjacent, elongate parallel foam strips, each strip comprising a curved surface between two longitudinal weld seams which maintain the curvature of the surface, adjacent strips being joined to each other by a longitudinal weld seam, and the individual strips being manually separable from the array.

8. An array as claimed in claim 7, wherein at least a portion of the surface of each strip is coated with a pressure sensitive adhesive.

9. An array as claimed in claim 7, wherein the foam is cold-weldable.

10. An array as claimed in claim 7, having a length of at least one meter, the array being wound in roll form.

11. A foam article formed of a foam capable of cold welding and having a curved surface maintained under compression by a welded seam, the article being at least partially coated with a surface layer.

12. A foam article as claimed in claim 11, in the form of an elongate pad or block.

13. A foam article as claimed in claim 11, wherein the surface layer comprises a pressure sensitive adhesive.

14. A foam article as claimed in claim 11, wherein the surface layer comprises abrasive particles and a binder.

15. A foam article as claimed in claim 14, wherein a portion of the surface of the article is coated with an abrasive layer and an opposing surface is coated with a pressure sensitive adhesive.

16. A method of producing a foam article in the form of an elongate strip comprising a curved surface, comprising the step of longitudinally compressing a predetermined area of an elongate cold-weldable foam web using a blunt rotary cutter, so that a cold welded seam is formed which secures opposing surfaces of the web to each other at the region of the weld, thereby forming the curved surface.

17. A method as claimed in claim 16, wherein the web is compressed along at least two parallel longitudinal lines to form at least one cord having a pair of longitudinal welded seams and a circular or oval cross-section.

18. A method as claimed in claim 16, wherein the curved surface is at least partially coated with a surface layer comprising a pressure sensitive adhesive.

19. A method as claimed in claim 16, wherein the edge of the blunt rotary cutter has a width of about 0.5 to 1.5 mm.

20. A method of making an array of adjacent elongate foam strips comprising the steps of compressing a foam web along a series of three or more parallel lines to form curved surfaces on the web between the lines, and welding the compressed foam along the parallel lines to maintain the curvature of the surfaces, the welded foam joining adjacent strips but enabling manual separation of the strips along the parallel lines.

21. A method as claimed in claim 20, further comprising the step of winding the array on a core so that the strips can later be unwound from the core and manually separated from one another.

22. A method as claimed in claim 20, wherein the foam is welded using ultrasound or heat.

23. A method as claimed in claim 20, wherein the foam is welded using cold welding.

24. A method as claimed in claim 23, wherein the foam web comprises a polyester foam.

* * * * *